United States Patent [19]
Chi

[11] Patent Number: 5,197,809
[45] Date of Patent: Mar. 30, 1993

[54] JOURNAL FOR A FRAME FORK OF A BICYCLE

[76] Inventor: Yi-Chen Chi, No. 139-5, An Mei Rd., Mei Shan Village; Hou Li Hsiang, Taichung Hsien, Taiwan

[21] Appl. No.: 861,770

[22] Filed: Apr. 2, 1992

[51] Int. Cl.$^5$ ............................................. F16C 19/18
[52] U.S. Cl. .................................... 384/617; 384/517; 384/540; 384/538; 384/616; 384/607
[58] Field of Search ............... 384/617, 616, 538, 540, 384/517, 513, 489, 607

[56] References Cited

U.S. PATENT DOCUMENTS

| | | | |
|---|---|---|---|
| 2,970,018 | 1/1961 | Ruttgers | 384/540 |
| 3,937,535 | 2/1976 | Ladin | 384/540 |
| 4,240,677 | 12/1980 | Payne et al. | 384/540 |
| 4,934,839 | 6/1990 | Chi | 384/477 |
| 5,000,589 | 3/1991 | Ogata et al. | 384/517 |

Primary Examiner—Lenard A. Footland
Attorney, Agent, or Firm—Poms, Smith, Lande & Rose

[57] ABSTRACT

A journal for a frame fork of a bicycle including a sleeve engaged on the frame fork and a bearing engaged in an upper portion and a lower portion respectively, the frame fork including an outer thread formed on an upper end, a member threadedly engaged on the upper end of the frame fork and pressing against one of the bearings, and a cut laterally formed in the member such that the member is separated into two portions, a bolt engaged in an aperture formed in the member and perpendicular to the cut for coupling the two portions together.

3 Claims, 3 Drawing Sheets

JOURNAL FOR A FRAME FORK OF A BICYCLE

BACKGROUND OF THE INVENTION

1. Field of the Invention

The present invention relates to a journal, and more particularly to a journal for a frame fork of a bicycle.

2. Description of the Prior Art

The closest prior art of which applicant is aware is his prior Chi U.S. Pat. No. 4,934,839, filed Jun. 28, 1989, entitled "JOURNAL FOR A FRAME FORK OF A BICYCLE". Typically, the journal includes a cap (1) engaged on each end of the sleeve (72) and exposed outwards of the sleeve (72). The caps (i) should be made as strong as possible such that the caps will not be broken.

The present invention has arisen to provide novel journals for the frame fork of the bicycles.

SUMMARY OF THE INVENTION

The primary objective of the present invention is to provide a journal for stably supporting the frame fork of the bicycles.

In accordance with one aspect of the invention, there is provided a journal for a frame fork of a bicycle comprising a sleeve engaged on the frame fork and including a shoulder formed in an upper portion and a lower portion thereof respectively, a bearing engaged in each of the shoulders, the frame fork including an upper end having an outer thread formed thereon, a member threadedly engaged on the upper end of the frame fork and pressing against one of the bearings, the member including a cut laterally formed therein such that the member is separated into a first portion located above the cut and a second portion located below the cut, an aperture formed in the member and perpendicular to the cut, and a bolt threadedly engaged in the aperture for coupling the first portion and the second portion of the member together, whereby the frame fork is rotatably and stably supported in the sleeve, and the member is stably retained in place by the bolt.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
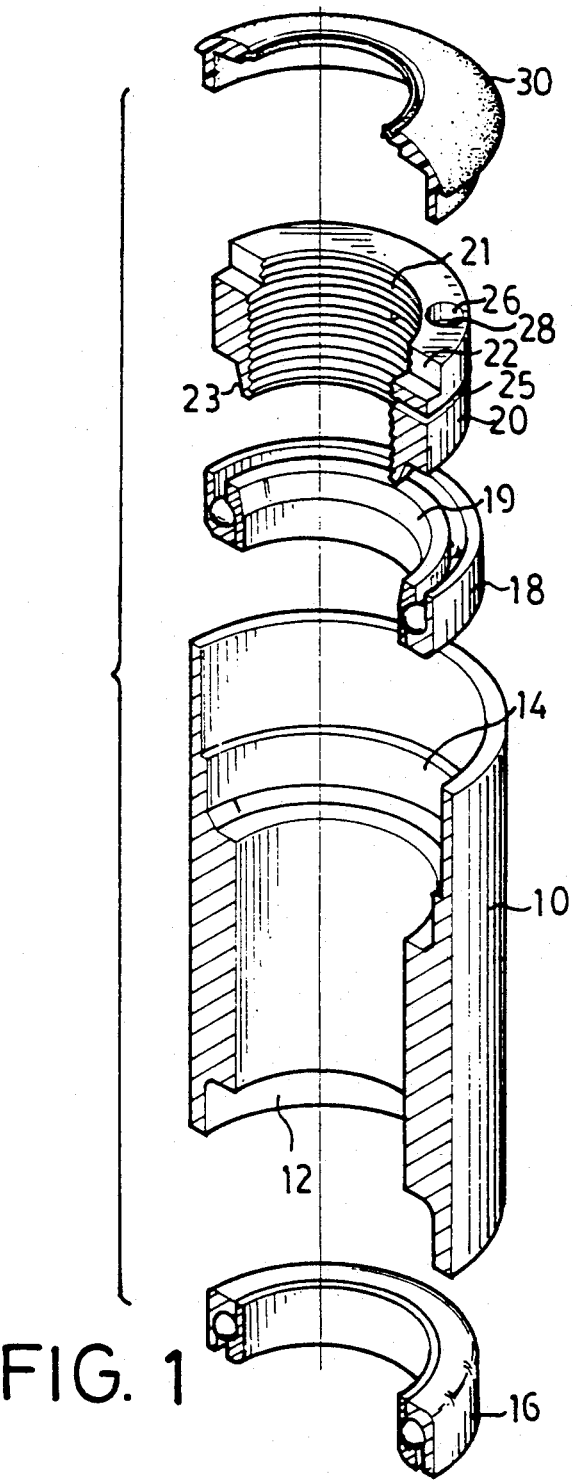
FIG. 1 is an exploded view of a journal in accordance with the present invention.
Figure 2:
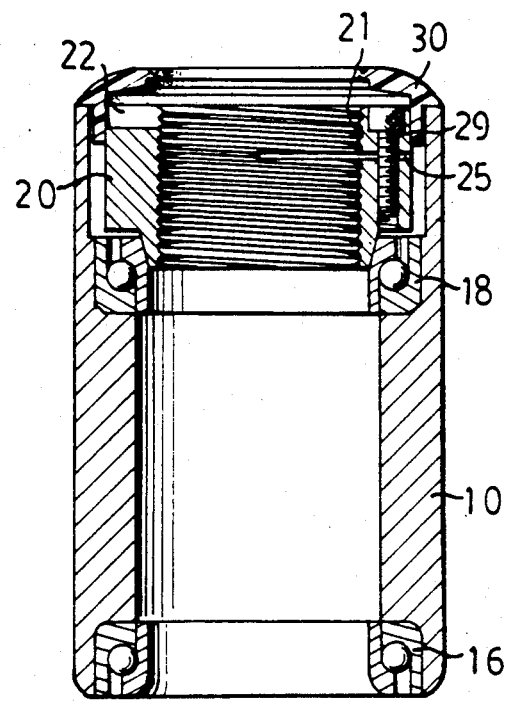
FIG. 2 is a cross sectional view of the journal.

Referring to the drawings, and initially to FIGS. 1 and 2, a journal in accordance with the present invention comprises generally a sleeve 10 including a shoulder 12, 14 formed in the lower portion and the upper portion thereof respectively, and a bearing 16, 18 engaged in each of the shoulders 12, 14. It is preferable that the bearing 18 includes a tapered surface 19 formed in the radially inwards portion and the upper portion thereof.

A member 20 which is substantially cylindrically shaped includes an inner thread 21 formed therein and a pair of notches 22 formed in the upper portion for engagement with a tool, similar to a screw driver, such that the the member 20 can be easily rotated. The member 20 includes an extension 23 formed in the radially inwards portion and the lower portion thereof. The extension 23 includes a tapered outer peripheral surface for engagement with the tapered surface 19 of the bearing 18. A cap 30 which is preferably made of rubber materials is engaged on the upper end of the sleeve 10 for preventing dust and the like from entering into the sleeve 10.

Figure 3:
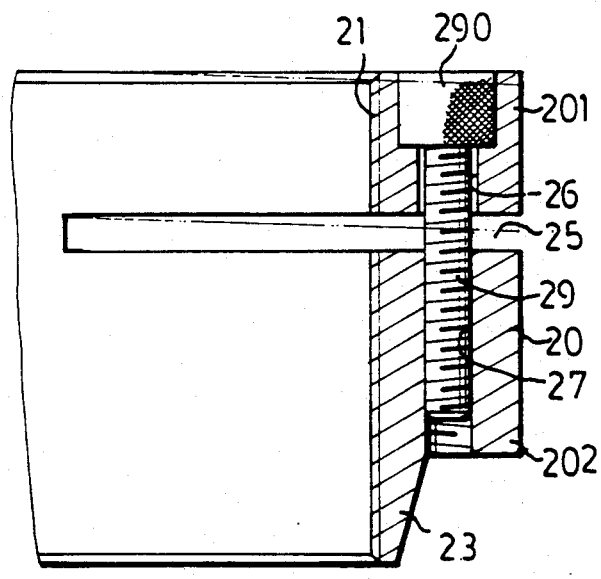
FIG. 3 is an enlarged cross sectional view of the member.

Referring next to FIG. 3 and again to FIGS. 1 and 2, the member 20 includes a cut 25 laterally formed in an upper portion thereof. At least one aperture 26 is formed in the member 20 and perpendicular to the cut 25 and includes an inner thread 27 formed in the lower portion and a shoulder 28 formed in the upper portion thereof. A bolt 29 is threadedly engaged with the inner thread 27 of the aperture 26 and includes a head 290 engaged with the shoulder 28 such that the first portion 201 of the member 20 located above the cut 25 will be urged to move downward toward the section portion 202 of the member 20 located below the cut 25, best shown in FIG. 3, such that the member 20 can further be stably retained in place.

Figure 4:
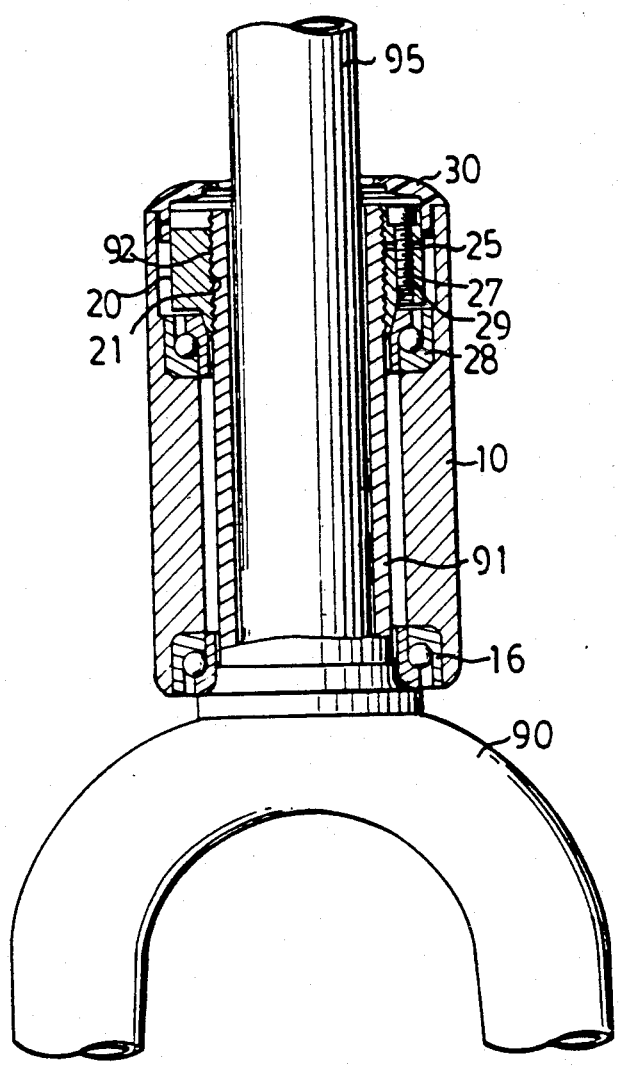
FIG. 4 is a cross sectional view illustrating the application of the journal.

Referring next to FIG. 4, a typical frame fork 90 includes a tube 91 extended upward therefrom and engaged in the sleeve 10. The bearings 16, 18 are engaged between the sleeve 10 and the tube 91 such that the tube 91 and thus the frame fork 90 are freely rotatable about the sleeve 10. The tube 91 includes an outer thread 92 formed on the upper portion thereof for engagement with the inner thread 21 of the member 20 such that the member 20 is movable up and down along the tube 91 by the threaded engagement therebetween. The bearing 18 can be compressed by tne member 20 such that the tube 91 can be stably supported in the sleeve 10. The member 20 can further be solidly engaged in place by the engagement between the tapered surface 19 of the bearing 18 and the tapered surface of the extension 23 of the member 20. The bolt 29 further fixes the member 20 in place. A handlebar stem 95 is fixed in the tube 91.

Accordingly, the journal in accordance with the present invention includes a solid structure and does not need the caps which is required in the conventional journals for supporting the frame forks. The frame fork can be stably supported in the journal. The member 20 can be stably retained in place by the bolt 29.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A journal for a frame fork of a bicycle comprising a sleeve engaged on said frame fork and including a shoulder formed in an upper portion and a lower portion thereof respectively, a bearing engaged in each of said shoulders, said frame fork including an upper end having an outer thread formed thereon, a member threadedly engaged on said upper end of said frame fork and pressing against one of said bearings, said member including a cut laterally formed therein such that said member is separated into a first portion located above said cut and a second portion located below said cut, an aperture formed in said member and perpendicular to said cut, and a bolt threadedly engaged in said aperture for coupling said first portion and said second portion of said member together, whereby said frame fork is rotatably and stably supported in said sleeve, and said member is stably retained in place by said bolt.

2. A journal according to claim 1, wherein said bearings include a first bearing engaged in said shoulder formed in said upper portion of said sleeve, said first bearing includes a first tapered surface formed in a radially inwards and upper portion thereof, said member includes an extension extended downward therefrom and having a second tapered surface formed in an outer peripheral portion thereof for engagement with said first tapered surface of said first bearing such that said extension of said member is stably engaged between said first bearing and said frame fork.

3. A journal according to claim 1, wherein said aperture includes an inner thread formed in a lower portion for engagement with said bolt and includes a second shoulder formed in an upper portion thereof for engagement with a head of said bolt such that said first portion and said second portion of said member are coupled together.

* * * * *